United States Patent
Drain

(10) Patent No.: US 10,010,157 B2
(45) Date of Patent: Jul. 3, 2018

(54) WIG DRYING ASSEMBLY

(71) Applicant: Beverly Drain, Pissburgh, PA (US)

(72) Inventor: Beverly Drain, Pissburgh, PA (US)

( * ) Notice: Subject to any disclaimer, the term of this patent is extended or adjusted under 35 U.S.C. 154(b) by 36 days.

(21) Appl. No.: 15/191,765

(22) Filed: Jun. 24, 2016

(65) Prior Publication Data

US 2017/0367464 A1    Dec. 28, 2017

(51) Int. Cl.
*A45D 44/14* (2006.01)
*F16B 45/00* (2006.01)
*F16B 47/00* (2006.01)
*A47F 7/06* (2006.01)

(52) U.S. Cl.
CPC ............. *A45D 44/14* (2013.01); *A47F 7/06* (2013.01); *A47F 7/065* (2013.01); *F16B 45/00* (2013.01); *F16B 47/00* (2013.01)

(58) Field of Classification Search
CPC ........ A45D 44/14; A45D 20/00; A45D 20/20; A45D 20/44; F16B 45/00; F16B 47/00; A47B 96/02; A47B 81/00; B65D 21/08; A41H 5/00; A47F 7/05; A47F 7/065
See application file for complete search history.

(56) References Cited

U.S. PATENT DOCUMENTS

| | | | | |
|---|---|---|---|---|
| 503,949 A * | 8/1893 | Crouch | ............... | A47G 25/10 211/32 |
| 593,560 A * | 11/1897 | Scott | ............... | A41G 3/0041 132/54 |
| 781,369 A * | 1/1905 | George | ............... | A47G 25/10 211/31 |
| 3,342,478 A * | 9/1967 | Shaw | ............... | A45D 44/14 132/54 |
| 3,447,726 A * | 6/1969 | George | ............... | A45D 44/14 132/54 |
| 3,726,022 A * | 4/1973 | Helwig | ............... | A45D 20/00 223/66 |
| 3,746,221 A | 7/1973 | Grifoni | | |
| 3,820,694 A | 6/1974 | Pabis | | |
| 4,033,538 A | 7/1977 | Levy | | |
| 4,185,398 A * | 1/1980 | LaMont | ............... | A45D 20/00 34/103 |
| 4,805,782 A * | 2/1989 | Hale | ............... | A47G 25/10 211/113 |
| 6,494,327 B2 | 12/2002 | Huang | | |
| 7,828,254 B2 * | 11/2010 | Stephens-De Alanis | ............... | A45D 44/00 211/30 |
| 8,381,413 B2 * | 2/2013 | Smith | ............... | F26B 25/18 211/116 |
| 8,439,210 B1 | 5/2013 | Griffith | | |
| D702,964 S | 4/2014 | Sterling | | |

FOREIGN PATENT DOCUMENTS

CN        2094930690 U  *  1/2016

* cited by examiner

Primary Examiner — Ismael Izaguirre

(57) ABSTRACT

A wig drying assembly includes a wire frame. A wig may be positioned on the wire frame when the wig is washed thereby facilitating the wig to air dry. A panel is positioned on the wire frame. The panel is comprised of a fluid absorbent material to absorb water from the wig when the wig is placed on the wire frame. A plurality of suction cups is provided. Each of the suction cups is coupled to the wire frame. Each of the suction cups may suctionally engage a wall in shower thereby facilitating the wire frame to retained on the wall in the shower.

4 Claims, 5 Drawing Sheets

WIG DRYING ASSEMBLY

BACKGROUND OF THE DISCLOSURE

Field of the Disclosure

The disclosure relates to drying devices and more particularly pertains to a new drying device for drying a wig in a shower.

SUMMARY OF THE DISCLOSURE

An embodiment of the disclosure meets the needs presented above by generally comprising a wire frame. A wig may be positioned on the wire frame when the wig is washed thereby facilitating the wig to air dry. A panel is positioned on the wire frame. The panel is comprised of a textures material to inhibit wig from sliding off of the wire frame. A plurality of suction cups is provided. Each of the suction cups is coupled to the wire frame. Each of the suction cups may suctionally engage a wall in shower thereby facilitating the wire frame to retained on the wall in the shower.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
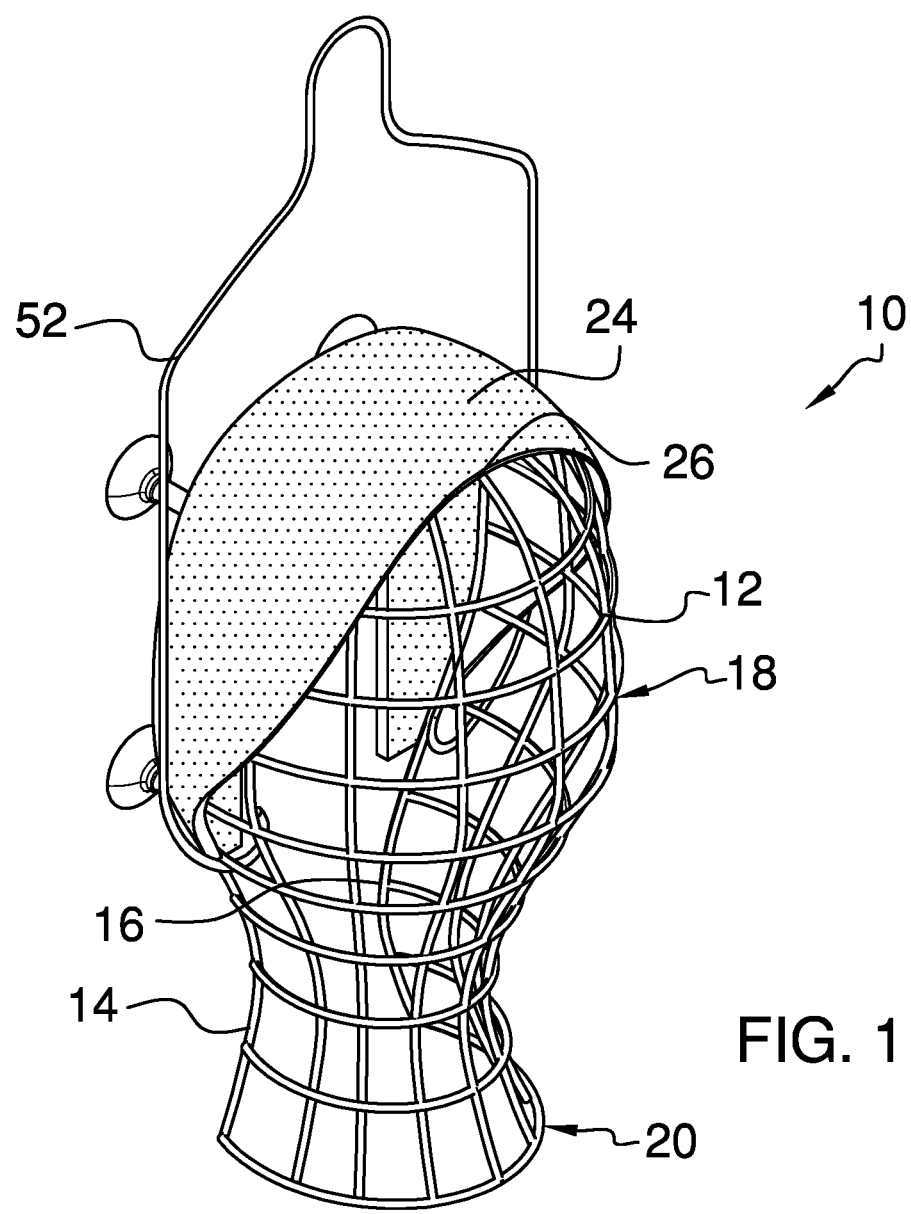
FIG. 1 is a front perspective view of a wig drying assembly according to an embodiment of the disclosure.
Figure 2:
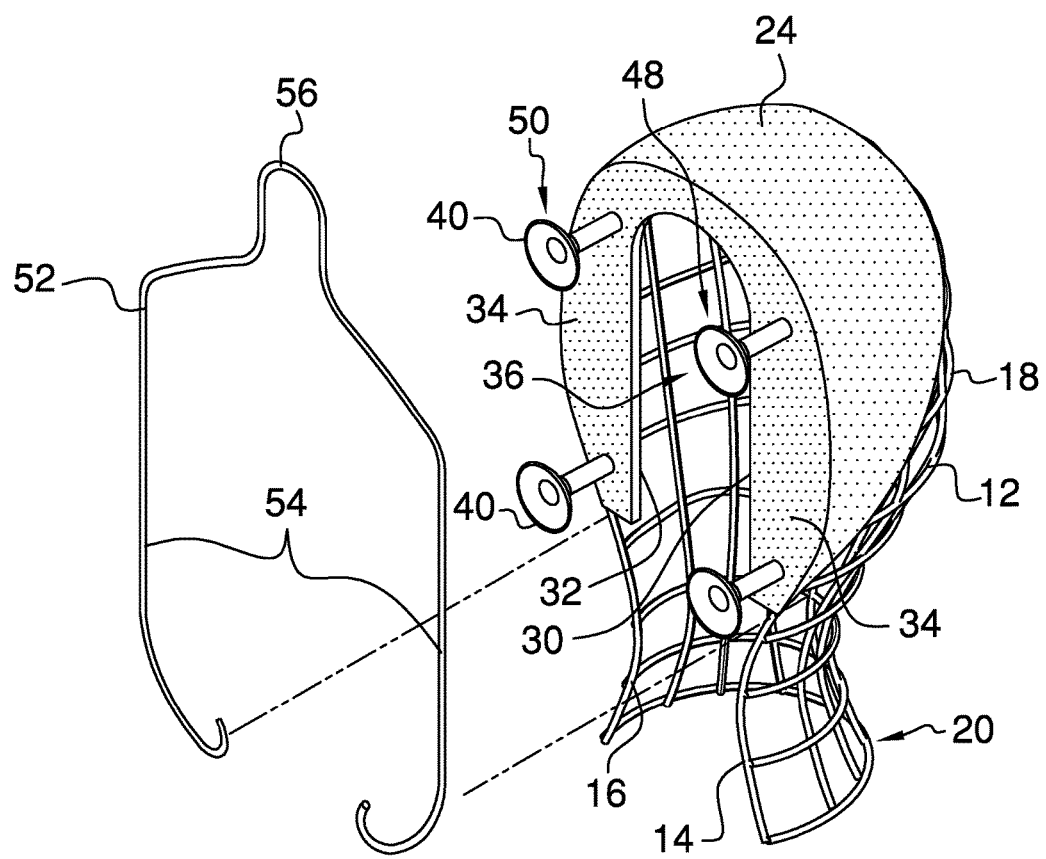
FIG. 2 is a back perspective view of an embodiment of the disclosure.
Figure 3:
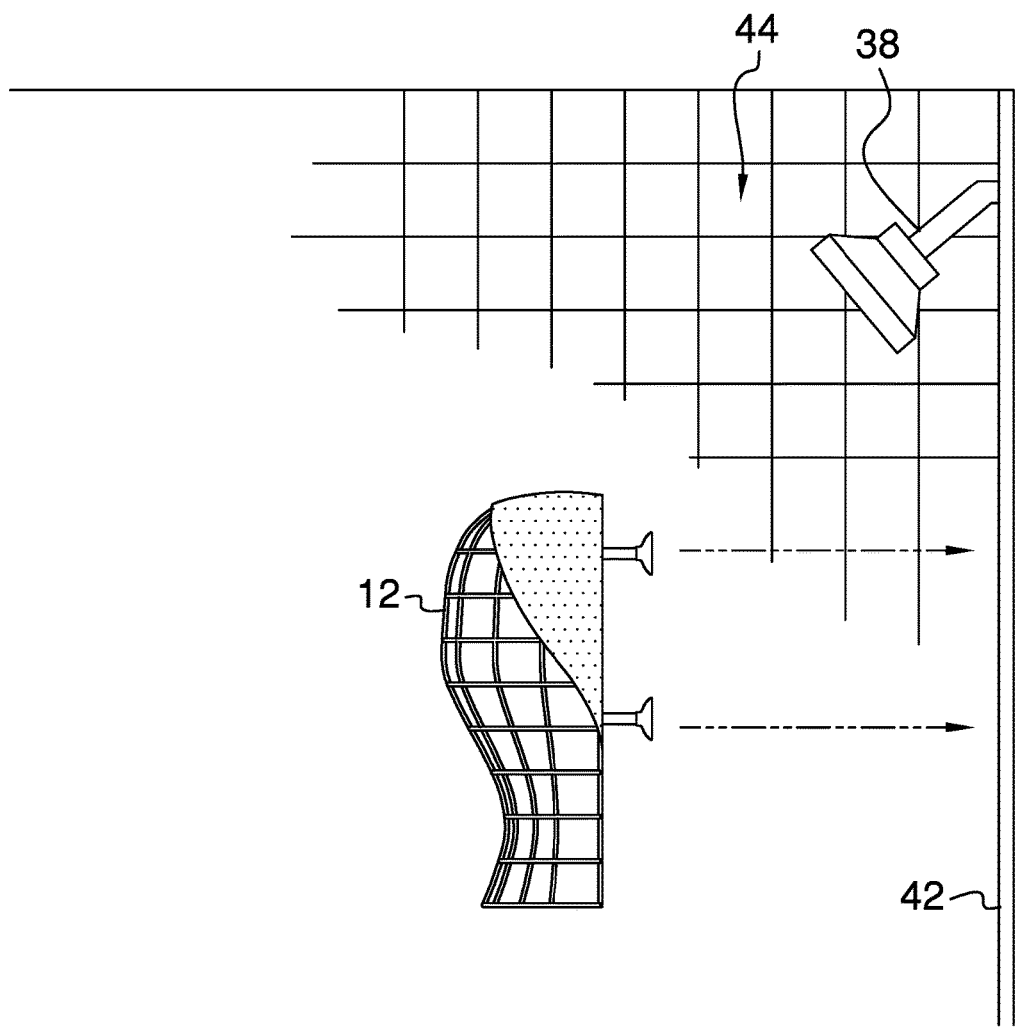
FIG. 3 is a right side perspective in-use view of an embodiment of the disclosure.
Figure 4:
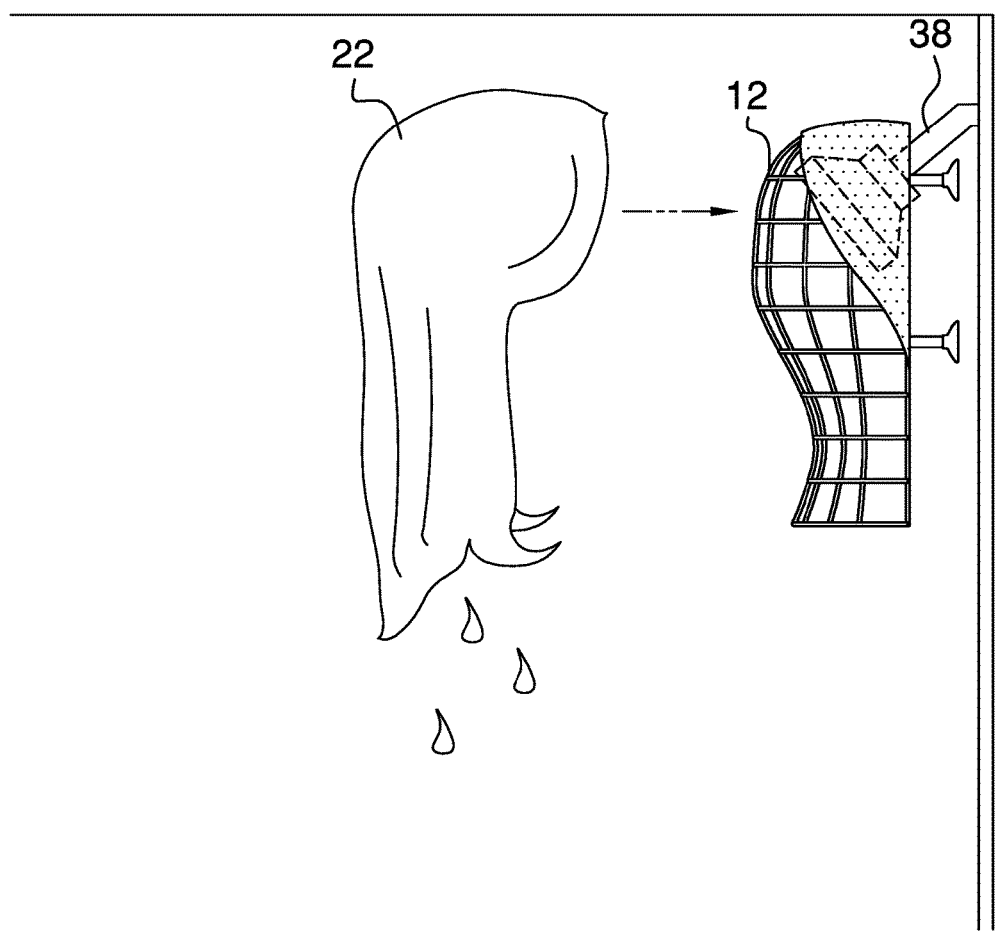
FIG. 4 is a perspective in-use view of an embodiment of the disclosure.
Figure 5:
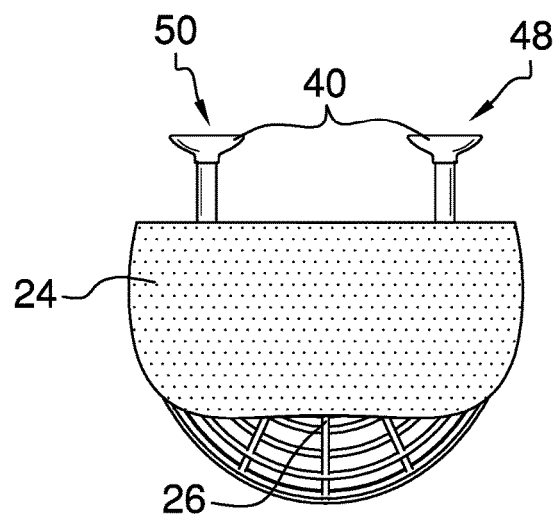
FIG. 5 is a top view of an embodiment of the disclosure.
Figure 6:
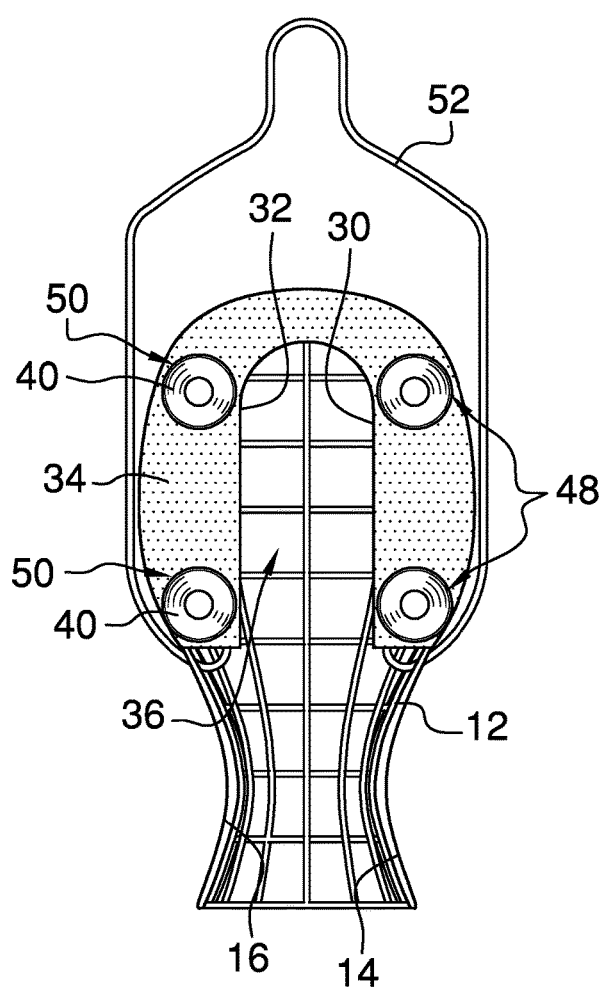
FIG. 6 is a back view of an embodiment of the disclosure.

With reference now to the drawings, and in particular to FIGS. 1 through 6 thereof, a new drying device embodying the principles and concepts of an embodiment of the disclosure and generally designated by the reference numeral 10 will be described.

As best illustrated in FIGS. 1 through 6, the wig drying assembly 10 generally comprises a wire frame 12 that has a first lateral edge 14 and a second lateral edge 16. The wire frame 12 is curved between the first lateral edge 14 and the second lateral edge 16. Thus, the wire frame 12 substantially forms a globe 18 and a pedestal 20 beneath the globe 18. The wire frame 12 resembles a human head and neck. The globe 18 may have a wig 22 positioned thereon when the wig 22 is washed thereby facilitating the wig 22 to air dry. The wire frame 12 retains the wig 22 in a natural position when the wig 22 is drying.

A panel 24 is provided and the panel 24 is positioned on the wire frame 12. The panel 24 is comprised of a textured material such as cork or the like. Thus, the panel 24 may inhibit the wig 22 from sliding off of the wire frame 12. The globe 18 has a top side 26 and the panel 24 substantially covers the top side 26.

The panel 24 has a first edge 30 and a second edge 32. The panel 28 wraps around the first lateral edge 14 and the second lateral edge 16 corresponding to the globe 18. Thus, a rear portion 34 of the panel 24 is defined that extends substantially between the first lateral edge 14 and the second lateral edge 16. The first edge 30 of the panel 28 is spaced from the second edge 32 of the panel 28. A space 36 is defined between the first edge 30 and the second edge 32 and a shower head 38 may be positioned in the space 36.

A plurality of suction cups 40 is provided and each of the suction cups 40 is coupled to the wire frame 12. Each of the suction cups 40 may suctionally engage a wall 42 in shower 44 thereby facilitating the wire frame 12 to be retained on the wall 42 in the shower 44. Each of the suction cups 40 includes a stem 46. The stem 46 corresponding to each of the suction cups 40 is coupled to the rear portion 34 of the panel 24. Each of the suction cups 40 is spaced from the rear portion 34.

The plurality of suction cups 40 includes a set of first suction cups 48 and a set of second suction cups 50. The stem 46 corresponding to each of the first suction cups 48 is aligned with and extends rearwardly away from the first lateral edge 14 of the wire frame 12. The stem 46 corresponding to each of the second suction cups 50 is aligned with and extends rearwardly away from the second lateral edge 16 of the wire frame 12. The stem 46 corresponding to each of the suction cups 40 may have a length of at least two cm.

A hook 52 is removably coupled to wire frame 12 and the hook 52 may be looped over the shower head 38. Thus, the wire frame 12 may be selectively suspended from the shower head 38. The hook 52 has a pair of spaced legs 54 and a loop 56 extending between the spaced legs 54. Each of the spaced legs 54 removably engages the wire frame 12. The loop 56 may extend around the shower head 38 when each of the spaced legs 54 removably engages the wire frame 12.

In use, the wire frame 12 is manipulated such that each of the suction cups 40 suctionally engages the wall 42 in the shower 44. Thus, the wire frame 12 is retained on the wall 42 in the shower 44. The wig 22 is placed on the wire frame 12 when the wig 22 is washed. Thus, the wig 22 may air dry in the shower 44 thereby inhibiting the wig 22 from dripping water on a floor of a bathroom or the like. The wig 22 is positioned in the shower 44 to facilitate the wig 22 to be dried discretely. The hook 52 is selectively coupled to the wire frame 12 and the wire frame 12 is selectively suspended from the shower head 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wig drying assembly being configured to be removably coupled to a vertical support surface, said assembly comprising:
   a wire frame being configured to have a wig positioned thereon when the wig is washed thereby facilitating the wig to air dry, said wire frame having a first lateral edge and a second lateral edge, said wire frame being curved between said first lateral edge and said second lateral edge such that said wire frame substantially forms a globe and a pedestal beneath said globe wherein said wire frame is configured to resemble a human head and neck, said globe having a top side;
   a panel being positioned on said wire frame, said panel being comprised of a textured material wherein said panel is configured to inhibit the wig from sliding off of said wire frame;
   a plurality of suction cups, each of said suction cups being coupled to said wire frame wherein each of said suction cups is configured to suctionally engage a wall in shower thereby facilitating said wire frame to retained on the wall in the shower; and
   a hook being removably coupled to wire frame, said hook being configured to be looped over the shower head thereby facilitating said wire frame to be selectively suspended from the shower head.

2. The assembly according to claim 1, wherein said panel substantially covers said top side of said globe, said panel having a first edge and a second edge, said panel wrapping around said first lateral edge and said second lateral edge corresponding to said globe such that said first edge of said panel is spaced from said second edge of said panel to define a space between said first edge and said second edge wherein said space is configured to have a shower head positioned therein.

3. The assembly according to claim 1, wherein:
   said wire frame has a first lateral edge and a second lateral edge; and
   each of said suction cups being coupled to said panel, said plurality of suction cups comprising a set of first suction cups and a set of second suction cups, each of said first suction cups being aligned with and extending rearwardly away from said first lateral edge of said wire frame, each of said second suction cups being aligned with and extending rearwardly away from said second lateral edge of said wire frame.

4. A wig drying assembly being configured to be removably coupled to a vertical support surface, said assembly comprising:
   a wire frame having a first lateral edge and a second lateral edge, said wire frame being curved between said first lateral edge and said second lateral edge such that said wire frame substantially forms a globe and a pedestal beneath said globe wherein said wire frame is configured to resemble a human head and neck, said globe being configured to have a wig positioned thereon when the wig is washed thereby facilitating the wig to air dry, said globe having a top side;
   a panel being positioned on said wire frame, said panel being comprised of a textured material wherein said panel is configured to inhibit the wig from sliding off of said wire frame, said panel substantially covering said top side of said globe, said panel having a first edge and a second edge, said panel wrapping around said first lateral edge and said second lateral edge corresponding to said globe such that said first edge of said panel is spaced from said second edge of said panel to define a space between said first edge and said second edge wherein said space is configured to have a shower head positioned therein;
   a plurality of suction cups, each of said suction cups being coupled to said wire frame wherein each of said suction cups is configured to suctionally engage a wall in shower thereby facilitating said wire frame to retained on the wall in the shower, each of said suction cups being coupled to said panel, said plurality of suction cups comprising a set of first suction cups and a set of second suction cups, each of said first suction cups being aligned with and extending rearwardly away from said first lateral edge of said wire frame, each of said second suction cups being aligned with and extending rearwardly away from said second lateral edge of said wire frame; and
   a hook being removably coupled to wire frame, said hook being configured to be looped over the shower head thereby facilitating said wire frame to be selectively suspended from the shower head, said hook having a pair of spaced legs and a loop extending between said spaced legs, each of said spaced legs removably engaging said wire frame, said loop being configured to extend around the shower head when each of said spaced legs removably engages said wire frame.

* * * * *